United States Patent
Pinkus

(10) Patent No.: US 7,379,897 B2
(45) Date of Patent: May 27, 2008

(54) AUTOMATIC PAYMENT SYSTEM USING RF ID TAGS

(76) Inventor: Ron Pinkus, 5928 Pebblestone La., Plano, TX (US) 75093

( * ) Notice: Subject to any disclaimer, the term of this patent is extended or adjusted under 35 U.S.C. 154(b) by 0 days.

(21) Appl. No.: 11/042,196

(22) Filed: Jan. 26, 2005

(65) Prior Publication Data
US 2005/0184155 A1 Aug. 25, 2005

Related U.S. Application Data

(62) Division of application No. 09/740,808, filed on Dec. 21, 2000.

(51) Int. Cl.
G06Q 10/00 (2006.01)
G06Q 20/00 (2006.01)
G06Q 30/00 (2006.01)
H04K 1/00 (2006.01)
H04L 9/00 (2006.01)

(52) U.S. Cl. .............................. 705/16; 705/1; 705/18; 705/23; 705/64; 705/73

(58) Field of Classification Search ................. 705/15, 705/16, 17, 21, 1, 18, 23, 64, 73; 340/539.1, 340/539.11
See application file for complete search history.

(56) References Cited

U.S. PATENT DOCUMENTS

| | | | | |
|---|---|---|---|---|
| 5,101,200 A | * | 3/1992 | Swett .......................... | 340/937 |
| 5,253,162 A | * | 10/1993 | Hassett ....................... | 342/457 |
| 5,310,999 A | * | 5/1994 | Claus et al. ................. | 235/384 |
| 5,339,000 A | | 8/1994 | Bashan et al. | |
| 5,451,758 A | * | 9/1995 | Jesadanont .................. | 235/384 |
| 5,495,250 A | * | 2/1996 | Ghaem et al. ................ | 342/51 |
| 5,605,182 A | | 2/1997 | Oberrecht et al. | |
| 5,640,002 A | * | 6/1997 | Ruppert et al. ......... | 235/462.46 |
| 5,705,818 A | * | 1/1998 | Kelbel et al. ............ | 250/361 R |
| 5,805,082 A | * | 9/1998 | Hassett ....................... | 340/928 |
| 5,913,180 A | | 6/1999 | Ryan | |
| 5,942,978 A | * | 8/1999 | Shafer ....................... | 340/572.9 |
| 6,121,880 A | * | 9/2000 | Scott et al. ............... | 340/572.5 |
| 6,157,824 A | | 12/2000 | Bailey | |

(Continued)

FOREIGN PATENT DOCUMENTS

JP 2000113375 A * 4/2000

OTHER PUBLICATIONS

The Lane Ranger Cruise Card gremlins take their toll Joey Ledford. The Atlanta Journal-Constitution, Nov. 15, 1998. p. h.02.*

(Continued)

*Primary Examiner*—Calvin L. Hewitt, II
(74) *Attorney, Agent, or Firm*—Caesar, Rivise, Bernstein, Cohen & Pokotilow, Ltd.

(57) ABSTRACT

The present invention discloses systems and methods for enabling cashless fueling transactions through the use of vehicle-based decal sticker RFID tags. The tags store a unique customer identification number as well as other frequent purchase information. When read by a reader installed at the fuel dispenser, the tag information is sent to the network host via the Point of Sale ("POS") system, where it is linked to a customer's account for transaction processing and subsequent activation of the fuel dispenser. Several tags may be read by a single interface unit, avoiding the need to connect a tag reader to each fuel dispenser.

7 Claims, 4 Drawing Sheets

U.S. PATENT DOCUMENTS

| | | | |
|---|---|---|---|
| 6,218,943 B1* | 4/2001 | Ellenbogen | 340/572.4 |
| 6,236,314 B1* | 5/2001 | Smith et al. | 340/572.7 |
| 6,255,993 B1* | 7/2001 | Greeff et al. | 343/700 MS |
| 6,275,157 B1* | 8/2001 | Mays et al. | 340/572.5 |
| 6,278,369 B2* | 8/2001 | Smith et al. | 340/572.7 |
| 6,313,737 B1 | 11/2001 | Freeze et al. | |
| 6,343,241 B1 | 1/2002 | Kohut et al. | |
| 6,445,309 B1 | 9/2002 | Walker et al. | |
| 6,446,049 B1 | 9/2002 | Janning et al. | |
| 6,527,176 B2* | 3/2003 | Baric | 235/381 |
| 6,529,880 B1* | 3/2003 | McKeen et al. | 705/17 |
| 6,642,855 B2* | 11/2003 | Budnovitch | 340/932.2 |
| 6,653,946 B1* | 11/2003 | Hassett | 340/928 |
| 2002/0111715 A1 | 8/2002 | Richard | |
| 2002/0111768 A1 | 8/2002 | Ghorayeb et al. | |

OTHER PUBLICATIONS

R. White, How computers Work, Millennium Ed., Que Corporation, Sep. 1999.

F. Derfler, et al., How Networks Work, Millennium Ed., Que Corporation, Jan. 2000.

P. Gralla, How the Internet Works, Millennium Ed., Que Corporation,, Aug. 1999.

* cited by examiner

AUTOMATIC PAYMENT SYSTEM USING RF ID TAGS

This application is a division of application Ser. No. 09/740,808 filed on Dec. 21, 2000

BACKGROUND OF THE INVENTION

1. Field of the Invention

The present invention relates to automatic payment systems, and more particularly, to a vehicle identification and payment system that uses RF ID tags.

2. Description of the Prior Art

One way that merchants attract consumers to their businesses is by offering convenient and superior service. One example is the drive-through lane of a fast food restaurant which allows a customer to place an order, pay for the order and receive the ordered food without leaving his or her vehicle. Other businesses such as gas stations and dry cleaners offer similar types of conveniences that are also based on the knowledge that many of their customers will likely be arriving in a vehicle. For example, a dry cleaner may have a drive-through service or convenient short-term parking stalls near the entrance of the establishment providing the customer with easy access to the business.

Another convenience generally offered to consumers is the ability to use credit cards or bank debit cards for the payment of goods and services. Such cashless systems allow the consumer to remit payment without having to manually withdraw and carry cash from a bank. One drawback with credit cards is the lengthy processing time required to complete a credit card transaction. Although current processing times of cashless systems are considered acceptable in many environments, especially when large transactions are involved, most cashless systems are inefficient for applications such as fueling vehicles where the size of the transaction is small, the customer arrives in a vehicle, and/or the customer expects fast service.

Cashless systems have been developed that overcome some of the deficiencies of a standard credit card transaction. For example, in certain automated parking garages a customer is provided with a radio frequency identification (RFID) tag which identifies the customer to the proprietor of the parking garage. The RFID tag may take many forms, for example it may be attached to the vehicle, provided in a card, or in a key fob. When the customer enters the parking facility, the RFID tag is interrogated by a card reader which is located at the entrance of the parking garage close to an entrance gate. The card reader is connected to a host computer which checks stored user information associated with the ID number, authorizes the car to enter, and tracks the time that the car is parked in the garage. A local host computer maintains account information for the identified vehicle, which can be used to prepare periodic billing statements that are mailed to the customer. A proprietor may have more than one parking garage, with each local host computer connected to a single remote computer for the centralized production of billing statements.

Another example of this type of system is MOBIL SPEEDPASST™ which is used for the purchase of gasoline. The company issues RFID tags to its customers that identify the customer by an ID number. When a customer pulls up to a gas pump, the RFID tag is interrogated to receive the ID number of the tag. That number is sent via satellite to a host computer which authenticates the tag. If authorized, the host computer returns an authorization signal to enable the gasoline pump. The host computer charges a previously selected credit or bank debit card to pay for the gasoline that was actually pumped. After the credit or the bank debit card transaction is complete, a receipt is printed for the customer. The final transaction is then recorded in a central database which is used to track customer buying patterns.

A problem associated with the prior art is that for each register used by a merchants, there needs to be a an RFID tag reader associated with it. For example, each gas pump in a gas station that accepts payment through RFID tags must carry a tag reader. Therefore, there is a need in the art to simplify the system architecture of the existing cashless payment systems.

SUMMARY AND OBJECTS OF THE INVENTION

The system disclosed in the present application enables cashless fueling transactions through the use of vehicle-based decal sticker RFID tags. These tags store a unique customer identification number as well as other frequent purchase information. When read by a reader installed at a fuel dispenser location, the tag information is sent to the network host that authorizes the transaction via the Point of Sale ("POS") system, where it is linked to a customer's account for transaction processing and subsequent activation of the fuel dispenser. The system configuration of the present invention does not require a tag reader for each fuel dispenser.

In another embodiment of the present invention, a first authorization of the transaction takes place by reading the tags, but the final authorization of the transaction does not take place until after the customer provides a PIN number to the POS.

It is a primary object of the present invention to provide a method and system for cashless fueling transactions through the use of vehicle-based decal sticker RFID tags. It is a further object of the present invention to provide customers with the ability to store in their tags frequent purchaser information that could be used by merchants to offer rebates. Still further, it is another object of the present invention to achieve the foregoing objectives by enabling the communication between a single controller and a POS in order to manage the transactions requested by several tags in the vicinity of the controller.

With these and other objects, advantages and features of the invention that may become hereinafter apparent, the nature of the invention may be more clearly understood by reference to the following detailed description of the invention, the appended claims and to the accompanying drawings.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
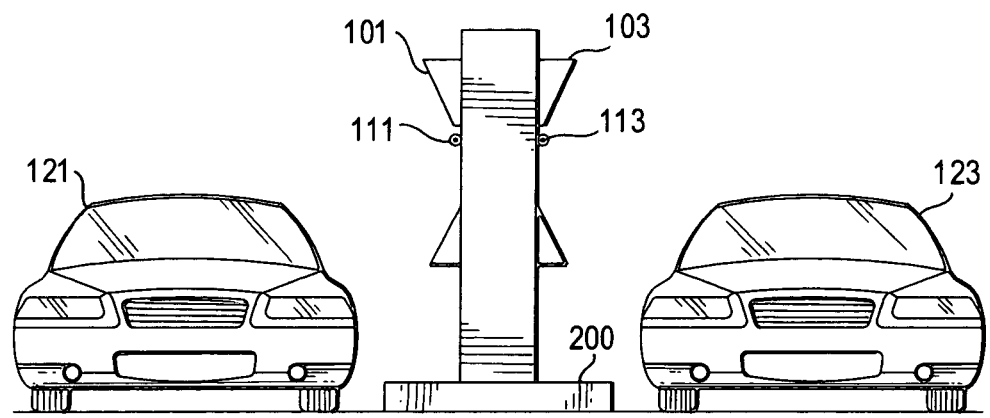
FIG. 1 is a first schematic view of one embodiment of the system of the present invention.
Figure 2:
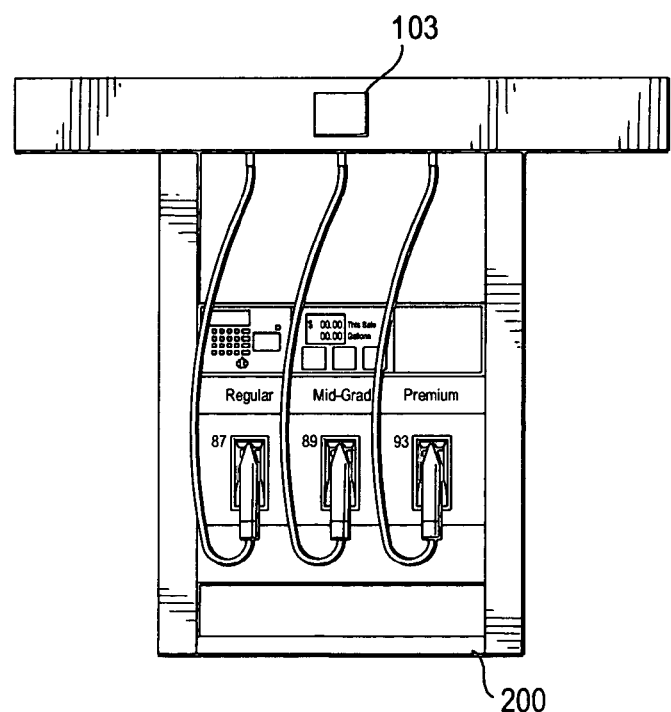
FIG. 2 is a second schematic view of one embodiment the system of the present invention.
Figure 3:
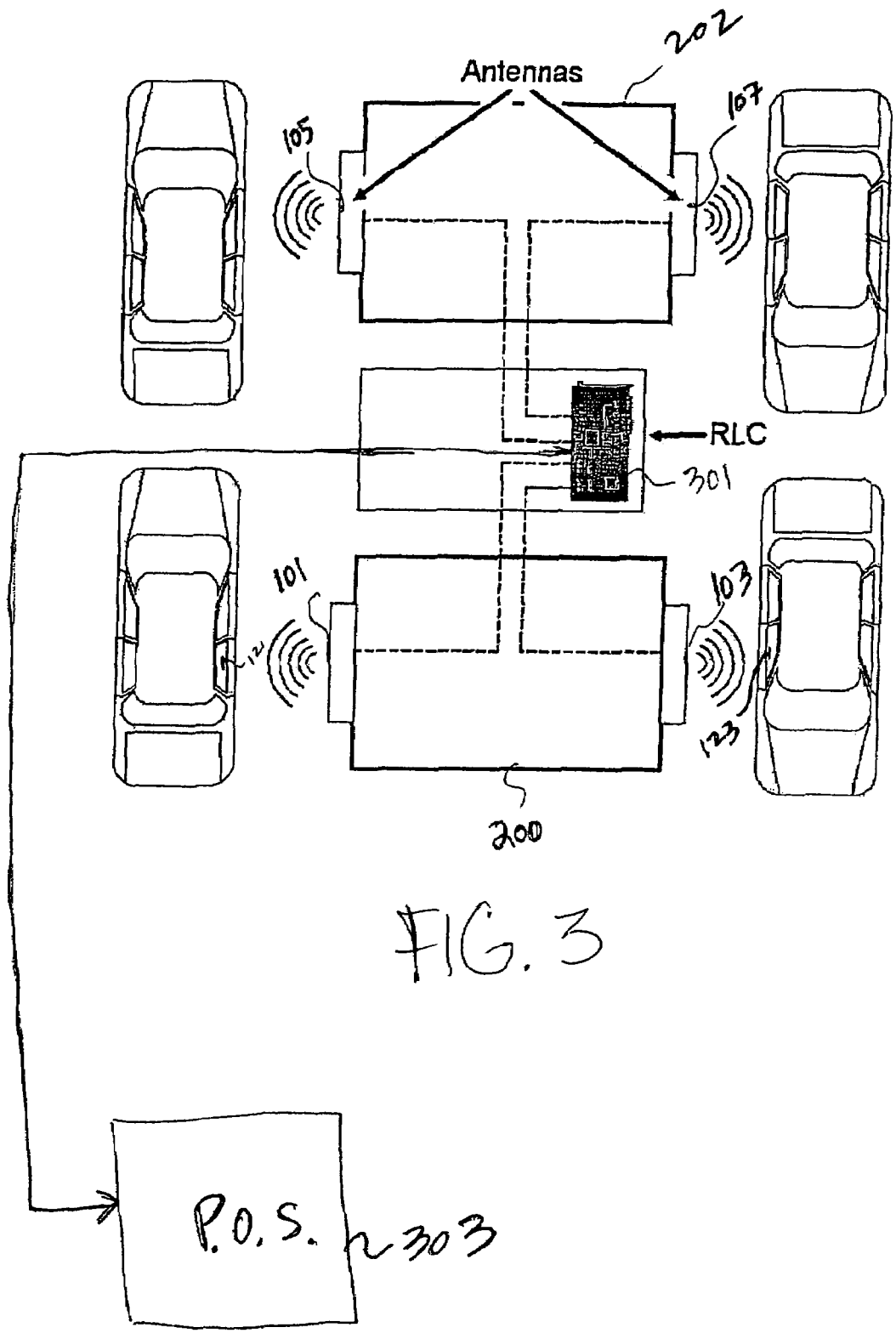
FIG. 3 is a third schematic view of one embodiment of the system of the present invention.

Referring to FIGS. 1-3, the RFID system of the present invention includes decal sticker RFID tags 121, 123; vehicle presence detectors 111, 113; antennas 101, 103, 109, and 107; an RFID localization controller subsystem (RLC) 301 in FIG. 3; fuel dispensers 200 and 202; and a POS system 303.

The RFID tags 121 and 123 should offer a wide reading range without using battery power. The tags 121 and 123 include a processor that is powered with energy transmitted by the RLC 301, which is located on the dispenser island. The RFID tag technology used should also provide read/write and memory capacity not provided by older, less flexible proximity technology. These tags may include enough EEPROM (i.e., memory) capacity so as to store a unique tag ID number and tag-specific manufacturing information. The EEPROM capacity should also allow for the memory to be written and rewritten thousands of times. Data stored on the tags can be transferred to the RLC 301.

The RFID tags may be windshield tags mounted in patrons' vehicles. To facilitate the highest possible localization accuracy, the tags 121 and 123 should be mounted on the windshield closest to the vehicle's fueling port. In most cases, the sticker will be mounted on the left side of the vehicle's rear windscreen. The association of tag to fueling port location will allow the system to accurately localize the correct tag with the correct vehicle.

Each tag is programmed with a unique ID number, which is encrypted to prevent fraud. For added security protection, the tags can be rendered inoperable upon removal, if desired. Additional information can be stored on each tag for uses such as electronic frequent purchase programs. For example, information stored on the tag could be communicated to the POS system 303 to enable a frequent patron to be offered multi-purchase incentives without necessitating a network transaction. A POS may be defined as a computer system that processes the transaction at the point of purchase.

Vehicle presence detector sensors 111 and 113 are mounted at each fueling station. They detect the presence of a vehicle at a fueling position and report this information to the RLC 301. The sensors are mounted above ground and require no disruption to the existing site facility.

RF antennas 101, 103, 105 and 107 are located at each fueling station. They may be mounted above the fuel pump in a manner that is safe and inconspicuously away from vehicles. These antennas may be disguised as signs, corporate symbols, advertising, etc., if so desired.

The RLC 301 is the main component of the present system. It may include a digital logic board set and a ruggedized enclosure for integration into RFID systems requiring accurate localization, range, and read/write transactions. The RLC 301 board set may include a tag interrogator (reader) board that provides RFID data collection, and a microprocessor controller board with firmware that interfaces to the vehicle detection system (111 and 113) and the dispenser POS system.

The RLC 301 receives vehicle detection notification from vehicle presence detectors 111 and 113 and activates the antennas 101 and 103 at that location. If the vehicle is equipped with a tag, the information from the tag is read through the corresponding antenna into the RLC reader. If there is no tag to read, the RLC 301 will continue for a predetermined amount of time to attempt to read a tag. If the time expires with no tag read or if the vehicle leaves the detection zone, the RLC 301 will discontinue the read attempt.

The RLC 301 instantly communicates tag information to the POS 303 to authorize the fueling transaction. Just as a keypad on a dispenser supplies a manual customer interface between the user and the POS 303 to enable a fueling transaction, the windshield tags automatically supply information to the RLC 301 via a wireless electronic interface between the user's vehicle tag and the antenna. That information is in turn forwarded from the RLC 301 to the POS 303. Standard serial and network interface connections between the RLC 301 and the POS may include RS-232, RS-485, and 10/100Base-T Ethernet.

As soon as a tag is read at a location with vehicle presence the tag information is transferred to the POS 303. The POS 303 acts on this information based on predefined business rules. For example, the following sequence of events could occur in less than one second:

1) The POS validates the tag as registered with the system.
2) The POS offers the customer the option to pay by the account associated with the tag.
3) The POS offers the customer options, such as printing a receipt, car wash, etc.
4) The POS enables the transaction.

As an option to further guarantee that the correct tag is associated with the proper vehicle, the POS 303 can prompt the patron for a personal information number (PIN) prior to dispensing any fuel. The combination of tag information and valid PIN makes it virtually impossible to dispense fuel to the wrong vehicle.

Frequent purchase information can also be written, stored, and read from the tags by the RLC 301 as an interface to the POS 303. This would allow vendors to read the frequent purchase information and then make special offers to those customers that have purchased a large amount of goods/fuel from that vendor.

As shown in FIG. 3, only one RLC 301 is required for up to four fueling positions (2 fueling dispensers 202 and 200). For example, a station that has two dispensers, with two fueling positions per dispenser, would require four vehicle presence detectors, four antennas, and one RLC.

This cost-effective implementation approach enables an RLC to be shared among multiple fueling positions. A significant benefit of the disclosed RFID system is that no physical interface to the fuel dispensers is required. All electronic equipment and interfaces are independent of the dispenser, because the RLC 301 communicates directly with the POS host over standard interfaces, such as RS-232, RS422, RS485, 10/1100Base-T Ethernet, etc. Thus, installation is unobtrusive, and requires no trenching of concrete. Further the RLC 301 is interoperable with any fuel dispensing equipment, since it requires no physical interface.

Figure 4:
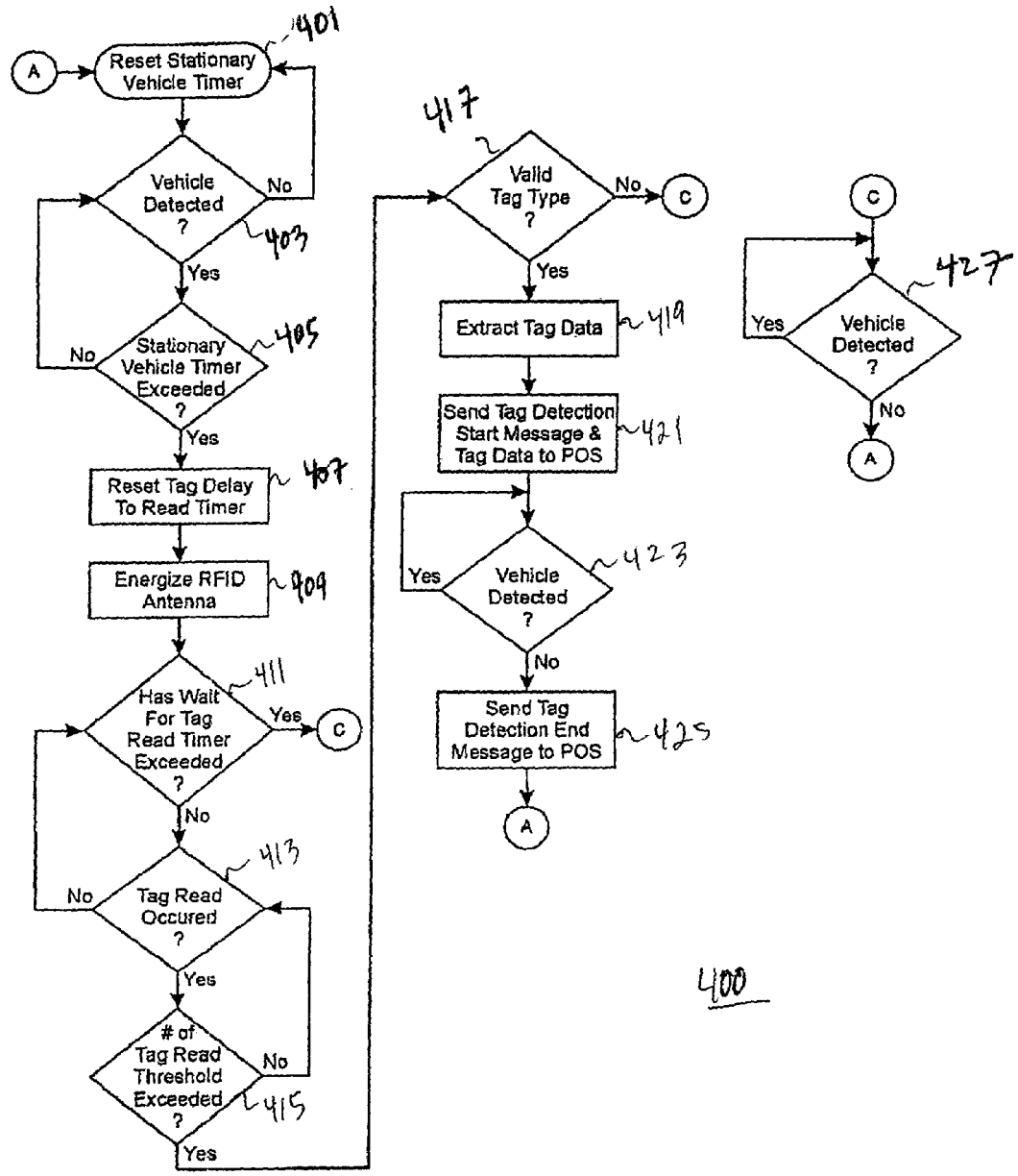
FIG. 4 is a flowchart of a first method according to a first embodiment of the present invention.

FIG. 4 illustrates a flowchart of a first method for payment by using the RFID tags according to the present invention. In step 401 a stationary timer is reset in the vehicle detection system. In step 403 it is determined whether a vehicle has been detected. If no vehicle is detected after a certain amount of time has elapsed, the stationary vehicle timer is reset again (step 401).

If a vehicle is detected by the vehicle detection system, then in step 405 it is determined whether the stationary vehicle timer has been exceeded. For example, if a vehicle is detected for a short period of time, then the vehicle is probably not stationary, and the process flow jumps back to step 403. In the event that the time is exceeded, and thus a stationary vehicle has been detected, the tag delay is reset 407 to read the stationary timer.

In step 409 the RFID antenna is energized for transmission. In step 411 it is determined whether a wait for a tag reader time has been exceeded. The idea is to reset the timer when not tag is read.

In the event that the wait for the tag read timer has been exceeded, the process jumps to step 427, in which the process loops until a vehicle leaves the premises. In the event that the wait for the tag reader time has not been exceeded, it is then determined whether the tag reader was able to read the tag 413. If a read has not occurred, the process jumps back to step 411.

When a tag has been read, it is determined whether the number of tag read threshold has been exceeded 415. For example, a threshold of five might be set. The tag is read 5 times to confirm that the tag is read correctly. If it is determined that the threshold has not been exceeded, the process jumps back to step 413. Otherwise, it is determined whether the read tag is a valid tag type 417. If it is determined that it is not, the process then jumps to step 427. Otherwise, the tag data is extracted 419, and a tag detection start message and tag data are sent to the POS 421. If at this point in the process the vehicle is still being detected, the system pauses 423. After the vehicle stops being detected, a tag detection end message is sent to the POS 425, and the stationary vehicle timer is reset 401.

Figure 5:
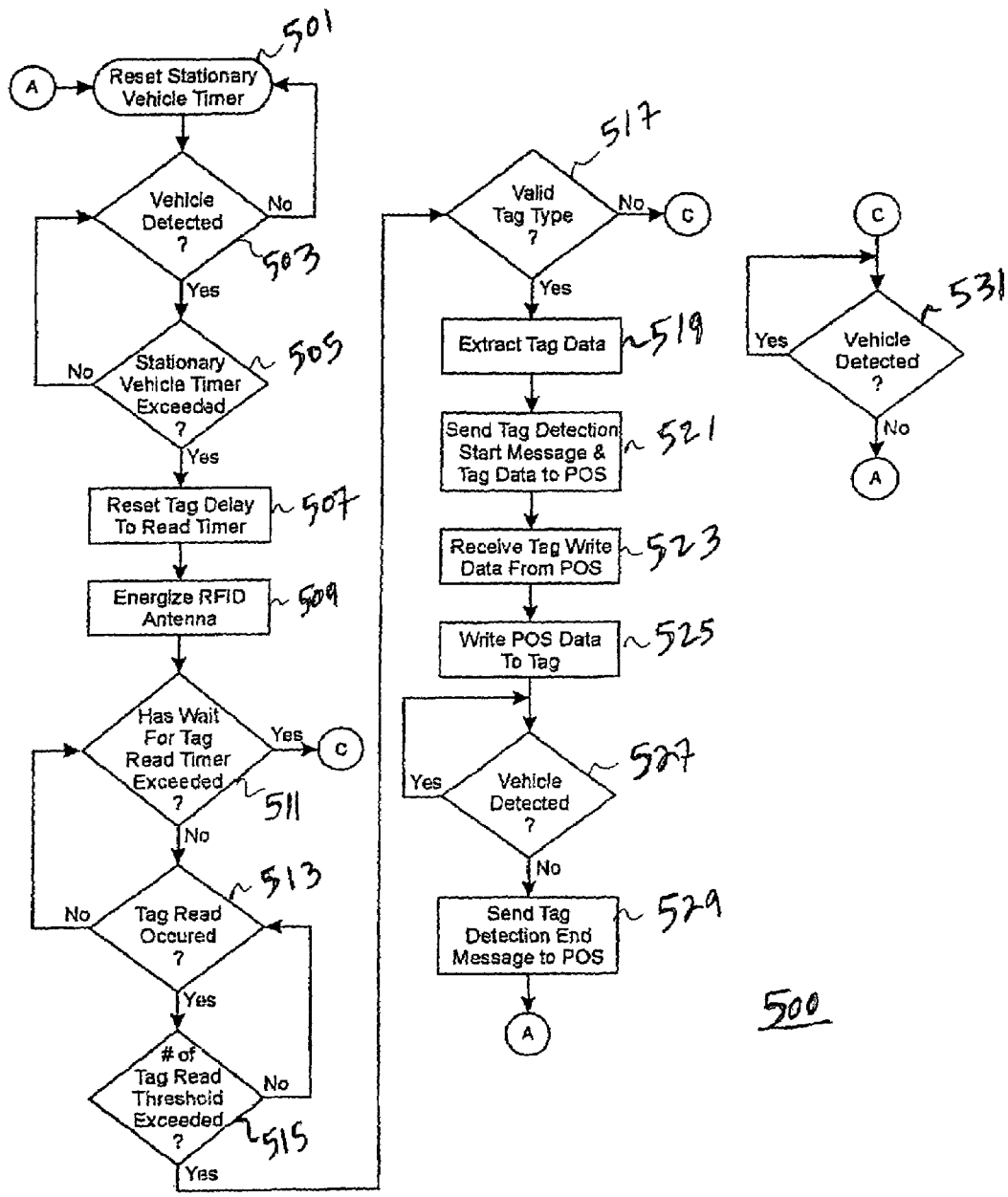
FIG. 5 is a flowchart of a second method according to a second embodiment of the present invention.

FIG. 5 illustrates a flowchart of a second method for payment by using the RFID tags according to the present invention. Steps 501-521 in FIG. 5 are the same as steps 401-421 in FIG. 4. Further, step 527 is the same as step 423; step 529 is the same as step 425; and step 531 is the same as step 427.

The main difference between the methods illustrated in FIG. 5 and FIG. 4 is the performance of two additional steps in FIG. 5 after the tag detection start message has been sent to the POS (step 521). Specifically, after step 521 takes place, tag write data is received from the POS in step 523, and that data is then written to the tag in step 525.

Advantages of the invention include a totally non-obtrusive system that does not require a physical interface to the fuel dispenser electronics, total interoperability among a plurality of dispenser vendors, and the ability to share a reader among multiple fuel dispensers.

The decal sticker tags of the present invention are safe and secure, providing a hands-free and cash-free means of customer identification and electronic payment. The tags may be rendered inoperable when removed from a vehicle's windshield.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A method of validating a tag, comprising:
   (a) resetting a stationary vehicle timer;
   (b) automatically detecting a presence of a vehicle bearing the tag;
   (c) outputting to a point of sale device a tag detection start message and identification information identifying the tag;
   (d) performing a sale in accordance with the identification information, using the point of sale device, and using the tag as a medium of payment;
   (e) receiving tag write data from the point of sale device; and
   (f) writing the tag write data into the tag;
   wherein step (b) comprises determining that the vehicle has been stationary for a period exceeding the stationary vehicle timer and based on the determination outputting to the point of sale device that the presence of the vehicle has been detected.

2. The method of claim 1, wherein the sale comprises a sale of fuel for the vehicle.

3. The method of claim 2, wherein: a plurality of fueling stations are provided, each with a vehicle presence detector and an antenna;
   the vehicle presence detectors and the antennas are in communication with a single controller subsystem which is in communication with the point of sale device; and
   detecting by one of the vehicle presence detectors the presence of the vehicle and based on the detection the controller subsystem activates a corresponding one of the antennas.

4. The method of claim 1, further comprising receiving a manual input of a personal identification number, and wherein step (c) comprises performing the sale in accordance with both the identification information and the personal identification number.

5. The method of claim 1, wherein the tag write data comprise data regarding the sale.

6. The method of claim 5, wherein the tag stores frequent purchase information.

7. The method of claim 6, further comprising:
   (f) reading the frequent purchase information; and
   (g) providing an offer to a user in accordance with the frequent purchase information.

* * * * *